United States Patent [19]

Tour et al.

[11] Patent Number: 5,047,380

[45] Date of Patent: Sep. 10, 1991

[54] CERAMIC MATERIALS, METHOD OF PREPARING THE SAME AND HYDROGENATION AND OXIDATION PROCESSES USING THE SAME

[75] Inventors: James M. Tour; Shekar L. Pendalwar; Joel P. Cooper, all of Columbia, S.C.

[73] Assignee: University of South Carolina, Columbia, S.C.

[21] Appl. No.: 498,802

[22] Filed: Mar. 23, 1990

[51] Int. Cl.$^5$ .............................................. B01J 31/12
[52] U.S. Cl. ...................................... 502/158; 528/15; 528/19; 528/31; 501/133
[58] Field of Search ................... 502/158, 162; 528/15, 528/19, 31; 501/133

[56] References Cited

U.S. PATENT DOCUMENTS

| | | | |
|---|---|---|---|
| 3,419,593 | 12/1968 | Willing | 502/158 |
| 3,516,946 | 6/1970 | Modic | 502/158 |
| 3,775,452 | 11/1973 | Karstedt | 502/169 |
| 3,856,837 | 12/1974 | Chandra | 502/158 |
| 3,865,759 | 2/1975 | Smith | 502/158 |
| 3,931,047 | 1/1976 | Smith | 502/158 |
| 4,157,313 | 6/1979 | Conan et al. | 502/158 |
| 4,256,616 | 3/1981 | Hatanaka et al. | 502/162 |
| 4,288,345 | 9/1981 | Ashby et al. | 502/158 |
| 4,786,618 | 11/1988 | Shoup | 501/12 |
| 4,847,228 | 7/1989 | Saruyama | 502/158 |

OTHER PUBLICATIONS

Hench et al., *Proc. S.P.I.E.-Int. Soc. Opt. Eng.* (1988) 76.
Hench, *Mater. Res. Soc. Symp. Proc.* (1988) 125:189.
Hench, *N.A.T.O. ASI Ser., Ser. E* (1985) 92:259.
Roy et al., *Mat. Res. Bull.* (1984) 19:169.
Roy et al., *Mat. Res. Soc. Symp. Proc.* (1984) 32:347.
Subbanna et al., *Mat. Res. Bull.* (1986) 21:1465.
Schubert et al., *Chem. Mat.* (1989) 1:576.
McEwen et al., *J. Org. Chem.* (1983) 48:4436.
Lindlar et al., *Org. Synth.* (1973) V:880.
Ulrich, "Chemical Processing of Ceramics", *C & EN* (Jan. 1, 1990) p. 28.

*Primary Examiner*—Anthony McFarlane
*Attorney, Agent, or Firm*—Brumbaugh, Graves, Donohue & Raymond

[57] ABSTRACT

The present invention relates to ceramic materials containing a homogeneous dispersion of metal particles, particularly sol-gel ceramic materials, a method of preparing the same, and processes for hydrogenating and oxidizing organic compounds using the same.

23 Claims, No Drawings

CERAMIC MATERIALS, METHOD OF PREPARING THE SAME AND HYDROGENATION AND OXIDATION PROCESSES USING THE SAME

This invention was made with Government support under Grant No. 2 S07 RR07160-14. The Government has certain rights in this invention.

BACKGROUND OF THE INVENTION

This invention was made with Government support under Grant No. 2 S07 RR07160-14. The Government has certain rights in this invention.

The present invention relates to ceramic materials containing a homogeneous dispersion of metal, particularly sol-gel ceramic materials, a method of preparing the same, and processes for hydrogenating and oxidizing organic compounds using the same.

BACKGROUND OF THE INVENTION

Ceramic materials exhibit various technologically important optical, mechanical and electronic properties. As dielectric materials, ceramics have a wide range of applications including uses in high energy particle beam accelerators, fusion experiments, free electron lasers and high powered lasers, high powered X-ray and microwave tubes, electrostatic generators, pulse power switches, space platforms, satellites, and solar arrays.

Organometallic sol-gel derived optics materials with excellent transmission properties and low thermal expansion coefficients have been synthesized. Hench, et al. *Proc. S.P.I.E. - Int. Soc. Opt. Eng.* (1988) 76; Hench, *Mater. Res. Soc. Symp. Proc.* (1988) 125:189, Hench, *N.A.T.O. ASI Ser., Ser. E.* (1985) 92:259. Ultra-low thermal expansion glass has been produced from transition metal-containing $SiO_2$ glasses. Shoup, U.S. Pat. No. 4,786,618.

Metal oxides have been used in the sol-gel process for encapsulation of metals in ceramic matrices. Roy et al., *Mat. Res. Bull.*, (1984) 19:169, Roy et al., *Mat. Res. Soc. Symp. Proc.*, (1984) 32:347; Subbanna et al., *Mat. Res. Bull.*, (1986) 21:1465. The standard method of producing metal-containing ceramic materials involves 1) dissolution of a metal salt and $Si(OR)_4$ in an aqueous/alcoholic solvent at a pH of less than 3 or greater than 9 to form a polymer gel; 2) drying of the gel to a xerogel; 3) calcination by heating to approximately 500° C. in air, and finally 4) reduction of the metal salt in hydrogen at 300° C. to 900° C. to produce the metal having a metallic(0) oxidation state.

Trialkylsilanes ($R_3SiH$) have been used to reduce transition metal salts to metals(0) in solution. It is also known in the art that triethoxysilane decomposes in aqueous solutions to form polysiloxane. In addition, the deposition of palladium onto a siloxane polymer has been achieved by using palladium(II) acetoacetonate and tetraethoxysilane followed by calcination. Schubert et al., *Chem. Mat..* (1989) 1:576.

Thus the conventional approach for incorporation of a metal into a ceramic matrix requires harsh (high temperature) reaction conditions. Moreover, reduction of the metal salt occurs only after the calcination process, meaning metal reduction takes place on solid, calcinated material. Under these conditions uniform reduction of the metal salt cannot be ensured. Nonhomogeneous calcinated products are obtained due to the fact that entire metal particles remain as cations, or metal particles are reduced only on their outer surfaces to the metallic(0) state. This stems from the fact that, in general, reactions on solids are far less efficient than reactions in solution. Moreover, calcinated ceramic materials are difficult to work with in that they cannot be easily shaped, molded or used to cast thin films.

To overcome these deficiencies of the prior art, applicants sought and found a method of preparing a ceramic matrix material containing a homogeneous dispersion of metal particles using sol-gel methods without calcination, in which the metal is completely reduced to the zero oxidation state as it is dispersed in the ceramic matrix material. In achieving this goal, applicants have also discovered that the resulting sol-gel ceramic matrix material is not only useful for known applications of ceramic compositions, but functions as a highly reactive and selective catalyst for hydrogenation and oxidation reactions. This is unusual since, in catalyst development, one normally achieves either a highly reactive or a highly selective catalyst.

In general, heterogeneous catalysts have been found to be more reactive than their homogeneous counterparts. Heterogeneous catalysts are often more resilient to air and moisture and they may exhibit longer catalytic lifetimes than homogeneous catalysts. Moreover, heterogeneous catalysts can be removed from a reaction system by simple filtration, and can therefore be used in flow systems, which makes them particularly attractive for industrial processes. However, heterogenous catalysts are often inferior in terms of selectivity. Accordingly, the development of homogeneous organometallic complexes for selective hydrogenation has emerged rapidly over the past two decades. However, the optimum catalyst would yield high selectivity with the advantages of heterogeneous systems. Applicants have found that finely divided metal encapsulated in a polysiloxane matrix according to the claimed invention is an effective and selective catalyst for hydrogenation and oxidation reactions at room temperature. The material is both water and air stable.

Silanes have been used in the presence of homogeneous palladium catalysts and acid to reduce alkynes, and the reduction of $\pi$-allyl palladium species to olefins can be effected using siloxane reagents. It has also been reported that platinum(II) complexes are reduced with triethoxysilane to form platinum(0) colloids and molecular hydrogen. These platinum(0) colloids are active hydrosilylation catalysts. However, the hydrogenated product obtained by these methods contains metal so finely dispersed that it cannot be removed, even by gel filtration. Instead, chromatography or distillation must be used to remove the metal from the final product.

SUMMARY OF THE INVENTION

Accordingly, the present invention relates to a compound comprising a polysiloxane matrix material containing a homogeneous dispersion of metal particles, wherein the polysiloxane matrix material is uncalcinated and substantially all of the metal particles are in the zero oxidation state.

The present invention also relates to a method of preparing the uncalcinated polysiloxane matrix material containing a homogeneous dispersion of metal particles in the zero oxidation state, which comprises mixing a siloxane compound having Si-H groups with a metal salt in an aqueous solution; wherein the siloxane compound is polymerized into a polysiloxane matrix, the metal is reduced to the zero oxidation state, and particles of the metal are homogeneously dispersed within the polysiloxane matrix.

The present invention further relates to a process for hydrogenating an organic compound, which comprises combining a catalytic amount of a polysiloxane matrix material containing a homogeneous dispersion of metal particles and the organic compound in the presence of molecular hydrogen, said polysiloxane matrix material being prepared by the method of mixing a siloxane compound having Si-H groups with an aqueous solution comprising a metal salt.

The present invention also relates to a process for oxidizing an organic compound, which comprises combining a catalytic amount of a polysiloxane matrix material containing a homogeneous dispersion of metal particles and the organic compound in the presence of molecular oxygen, said polysiloxane matrix being prepared by the method of mixing a siloxane compound having Si-H groups with an aqueous solution comprising a metal salt.

DETAILED DESCRIPTION OF THE INVENTION

Applicants' polysiloxane matrix material containing a homogeneous dispersion of metal particles is unique in that it contains metal in the zero oxidation state while still in the form of a sol, gel or xerogel. This enables the polysiloxane matrix material to be used in a variety of applications that require an uncalcinated material, i.e., applications that require molding, coating, and dipping. The polysiloxane matrix material also displays excellent adhesive qualities, most likely generated by Coulombic interactions among the metal particles dispersed within the matrix.

Suitable metals for encapsulation in the polysiloxane matrix material include those having a standard reduction potential ($E^\circ$) greater than the reduction potentials of $H_2$ and Si-H. Particularly useful metals are palladium, rhodium, platinum, ruthenium, copper, silver, antimony, rhenium, iridium, gold, mercury, bismuth, manganese and other metals of similar reduction potentials.

The metal preferably is dispersed within the polysiloxane matrix material in the form of fine particles and in an amount ranging from about 0.1 to 15 mole percent. Moreover, the metal is homogeneously dispersed in the polysiloxane matrix material. Preferably, the particle size of the metal in the polysiloxane matrix material is less than 100 Å, more preferably from 15 to 50 Å.

The compound of the invention may be prepared according to the claimed method as follows. A siloxane compound or mixture of siloxane compounds is combined and reacted with a metal salt in an aqueous solution, i.e., an aqueous or organic/aqueous solution. The metal salt contains the metal to be dispersed in the polysiloxane matrix.

Suitable siloxane compounds for use in the invention include those having Si-H groups. For example, monoalkoxysilanes, dialkoxysilanes, trialkoxysilanes, and tetralkoxysilanes and mixtures of the same may be used. If tetraalkoxysilanes are used, they must be used in conjunction with another siloxane compound. Preferably ethoxysilanes may be used, particularly triethoxysilane and mixtures of triethoxysilane with tetraethoxysilane. The siloxane compound or compounds should be freshly distilled before use.

On combination in the aqueous solution the siloxane compound polymerizes into a polysiloxane matrix. The metal salt promotes polymerization. At the same time, the metal is reduced to the metallic(0) oxidation state and is homogeneously dispersed in the polysiloxane matrix. Virtually uniform reduction of the metal from a cation to the metallic(0) state occurs during this sol-gel process. No heating or calcination steps are required, however calcination may be performed subsequently by conventional heating. Alternatively, the polysiloxane matrix material may be dried and stored in air for several weeks in the xerogel state.

During reaction of the metal salt and siloxane compound, hydrogen gas is produced. Both the siloxane and the hydrogen generated in situ serve to reduce the metal from a cationic oxidation state to a metallic(0) oxidation state.

The aqueous solution may comprise water alone or a mixture of water and an organic compound miscible with water and capable of solubilizing the siloxane compounds used in the method. A useful organic compound is tetrahydrofuran (THF). If a mixture of water and THF is used, the volume ratio of THF:water is preferably in the range of 2:1 to 10:1, more preferably 5:1.

Suitable metal salts for use in the claimed method are those soluble in the aqueous or organic/aqueous solution and formed from metals having a standard reduction potential ($E^\circ$) greater than the reduction potentials of $H_2$ and Si-H, for example, salts of palladium (II), rhodium (III), platinum (II), ruthenium (II), copper (II), silver (II), antimony (III), rhenium (I), iridium (IV), gold (I), mercury (II), bismuth (III), manganese (III) and the like.

For example, if it is desired to disperse and encapsulate palladium in the polysiloxane matrix material, suitable metal salts for use in the method include, for example, palladium(II) acetate and palladium(II) chloride. If it is desired to disperse and encapsulate rhodium in the polysiloxane material, a suitable metal salt for use in the method is, for example, rhodium(III) chloride.

Applicants' method of preparing the polysiloxane matrix material may be carried out at room temperature, and preferably the reaction is allowed to proceed for at least 2 hours, preferably 4 hours. A more highly crosslinked matrix may be made with increased reaction time, for example 24 hours.

Depending on the siloxane compound and the metal salt used in the above method, various polysiloxane matrix materials can be prepared according to this method. For example, reacting triethoxysilane with a metal salt results in a compound of the formula $[OSi(H)O]_n$ - - - $M(0)$, where M represents the metal. Reacting small amounts of triethoxysilane, larger amounts of tetraethoxysilane and a metal salt produces a compound of the formula $(SiO_3)n$ - - - $M(0)$ Accordingly, the claimed compound may be prepared wherein it exhibits no Si-H residue.

The polysiloxane matrix material may be isolated from the solution after reaction by removal of the solvent by drying in vacuo.

In addition to its applications as a sol-gel ceramic material, the polysiloxane matrix material is an excellent heterogeneous, selective catalyst for hydrogenation and oxidation of organic compounds. In the case of hydrogenation using the claimed compound, the reaction proceeds without the need for an external hydrogen source, since hydrogen gas is produced in situ. In addition, applicants believe that such hydrogenation proceeds by hydrometallic hydrogenation rather than hydrosilylation followed by protodesilylation.

The hydrogenation process according to the claimed invention comprises mixing and reacting a siloxane compound, as described above, with an aqueous solution, as described above, of a metal salt, as described above, and additionally an organic compound. The siloxane compound polymerizes into a polysiloxane matrix while the metal is reduced to the metallic(0) state and is homogeneously dispersed in the polysiloxane matrix material. The organic compound is hydrogenated by the polysiloxane matrix material and hydrogen. The polysiloxane matrix material may be removed from the reaction solution by filtration.

The oxidation process according to the claimed invention also comprises mixing and reacting a siloxane compound, as described above, with an aqueous solution, as described above, of a metal salt, as described above, and additionally an organic compound. As with hydrogenation the siloxane compound polymerizes into a polysiloxane matrix, while the metal is reduced to metallic(0) state and homogeneously dispersed in the polysiloxane matrix. The oxidation reaction is carried out under an inert or $O_2$ atmosphere. The organic compound is oxidized by the polysiloxane matrix material and oxygen. Even in an inert atmosphere oxidation proceeds as hydrogen is removed from the organic compound due to a shift in equilibrium. Again, the polysiloxane matrix material may be removed by filtration.

The polysiloxane matrix material may be made in advance and stored at room temperature and pressure, and later used in either the hydrogenation or oxidation process. If prepared in advance, the polysiloxane matrix material only need be added to the aqueous solution before commencement or hydrogenation or oxidation.

Preferably, hydrogenation or oxidation should be carried out for at least 30 minutes, preferably 45 minutes, in addition to the time necessary to form the polysiloxane matrix material. If preparation of the polysiloxane matrix material and hydrogenation or oxidation are carried out at the same time, the reaction should be carried out for at least 2 hours, preferably 4.5 hours.

The claimed hydrogenation process provides excellent yields of reduced organic compounds without any significant side products. Hydrogenation of alkynes to alkenes proceeds with very little over-hydrogenation; less than about 2 percent of the completely reduced alkane is observed. However, if complete reduction to the alkane is desired, methyl propynoate may be added to the reaction. Preferably 5 to 10 mole percent methyl propynoate is used in the reaction solution for this purpose. In addition, stereoselective hydrogenation may be carried out using the claimed polysiloxane matrix material.

The following non-limiting examples are designed to further illustrate the claimed invention.

EXAMPLE 1

Dispersion of palladium(0) in polysiloxane using THF/Water (5:1) as solvent.

To a solution of palladium(II) acetate (11 mg, 0.05 mmol) in THF (5 mL, distilled over sodium benzophenone ketyl prior to use) and water (1 mL deionized water, degassed by passing a stream of argon through it for 45 min.) was added freshly distilled triethoxysilane (0.41 g, 0.46 mL, 2.5 mmol) over 5 min. The solution immediately became black and rapid hydrogen evolution was observed. The solution was stirred at room temperature for 4 h. The solvent was removed by rotary evaporation and the polymer was dried in vacuo for 2.5 days to afford 0.14 g of shiny black flakes. Elemental Analysis: C, 1.43%; H, 1.92%; Pd, 0.15%; Si, 41.21%. IR (KBr pellet) 2263.7, 1166.7, 1065, 832.5, 738 cm$^{-1}$. Scanning electron microscopic analysis using energy dispersive analysis with X-rays (atomic %): Si, 95.53, 95.61; Pd, 4.47, 4.39.

It is believed that this reaction proceeded as follows:

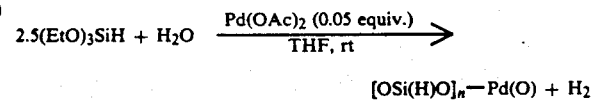

$$2.5(EtO)_3SiH + H_2O \xrightarrow[\text{THF, rt}]{Pd(OAc)_2\ (0.05\ \text{equiv.})} [OSi(H)O]_n-Pd(O) + H_2$$

EXAMPLE 2

Dispersion of palladium(0) in polysiloxane using water as a solvent.

To a solution of palladium(II) acetate (11 mg, 0.05 mmol) in water (5 mL) was added freshly distilled triethoxysilane (0.41 g, 0.46 mL, 2.50 mmol) over 5 min. The solution immediately darkened and rapid hydrogen evolution was observed. The reaction mixture was stirred for 16 h at room temperature and then filtered. The solvent was removed in vacuo to afford 0.1 g of a gray colored powder. Elemental Analysis: C, 1.89%; H, 1.42%; Si, 43.53%; Pd, 0.43%. IR (KBr pellet): 3439, 2255, 1633, 1152, 852 cm$^{-1}$.

It is believed that this reaction proceeded as follows:

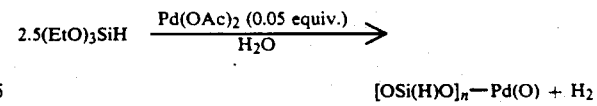

$$2.5(EtO)_3SiH \xrightarrow[\text{H}_2\text{O}]{Pd(OAc)_2\ (0.05\ \text{equiv.})} [OSi(H)O]_n-Pd(O) + H_2$$

EXAMPLE 3

Dispersion of palladium(0) in polysiloxane using a mixture of triethoxysilane and tetraethoxysilane.

Polysiloxane matrix material containing a homogeneous dispersion of palladium(0) particles having no Si-H residue was prepared as follows. To a solution of palladium(II) acetate (0.05 mmol) in water and THF (volume ratio of 1:5) was added freshly distilled triethoxysilane (0.25 mmol) along with tetraethoxysilane (2.50 mmol). The solution became black and hydrogen evolution was observed. The solution was stirred for 4 h. The solvent was then removed in vacuo, leaving behind black flakes. FTIR spectrum analysis showed no absorbance at ~2260 cm$^{-1}$, indicating that no Si-H residue was left on the polysiloxane matrix material.

EXAMPLE 4

Hydrogenation of 5-decyne to Z-5-decene.

To a solution of polysiloxane containing a homogeneous dispersion of palladium particles (0.13 g) prepared as described above in THF and water (0.05 mmol Pd), 5-decyne (0.138 g, 0.18 mL, 1.0 mmol) in a solution of THF (5mL) and water (1 mL) was added. Hydrogen was bubbled through the solution for 30 seconds and the reaction was then placed under a hydrogen atmosphere (balloon). The reaction was stirred at room temperature for 4.5 h. Capillary gas chromatograph analysis showed complete consumption of the alkyne and a 94% yield of Z-5-decene using dodecane as an internal standard. The product was too volatile for an accurate isolated yield. However, a portion was isolated and analyzed spectroscopically. IR (neat) 2925.5, 2850.0 1460.1 cm$^{-1}$. $^1$H NMR (300MHz, CDCl$_3$)δ5.33 (br t, J=4.5 Hz, 2H), 2.01 (br q, J=5.6 Hz, 4H), 1.3–1.2 (m, 8H), 0.86 (t, J=6.8 Hz, 6H) [>12:1 Z/E stereochemistry]. $^{13}$C NMR (20 MHz, CDCl$_3$)δ129.87, 30.25, 26.93, 22.25, 13.98.

EXAMPLE 5

Oxidation of 2-methyl-1,4-dihydrobenzoic acid to 2-methylbenzoic acid. To a suspension of 2-methyl-1,4-dihydrobenzoic acid (0.085 g, 0.05 mmol; 81% pure, from Aldrich Chemical Company) in decalin (5 mL) under a nitrogen atmosphere was added the polysiloxane matrix material containing a homogeneous dispersion of metal particles (0.100 g). The solution was heated to reflux for 19 h. On cooling the reaction mixture was diluted with hexane (25 mL) and extracted with aqueous sodium hydroxide (5%) solution (2×5 mL). The basic aqueous solution was acidified and extracted with chloroform (3×4 mL). The combined organic layer was dried over anhydrous sodium sulfate. Removal of solvent on rotary evaporator gave 2-methylbenzoic acid (0.065 g. 96%). IR(KBr) 3600–2000 (br), 2923, 1694, 1300, 920, 731 cm$^{-1}$. $^1$H NMR (300 MHz, CDCl$_3$) δ8.03 (ddd, J=8.5, 3.0, 1.5 Hz, 1 H), 7.42 (td, J=8.5, 1.5 Hz, 1H), 7.26 (td, J=8.5, 1.5 Hz, 1 H), 7.22 (dd, J=8.5, 1.5 Hz, 1 H), 2.64 (s, 3 H).

Various examples of the hydrogenation process are shown in Table I. Reactions were allowed to stir for 2–5 hours before filtration of the polysiloxane matrix material through a plug of silica gel. The reduction proceeded readily on α, β-unsaturated esters and ketones. Excellent chemoselectivity was observed in that while terminal olefins hydrogenated cleanly (entry 12), internal unactivated olefins remained unreduced (entry 14). The superb stereoselectivity of this process is demonstrated by entry 17 in the reduction of 5-decyne to Z-5-decene (>15:1 Z:E) in 100% yield, representing a simple alternative to the Lindlar reduction process.

The conventional method of stereoselective hydrogenation of unsaturated hydrocarbons is the Lindlar reduction process. McEwen et al., *J. Org. Chem.*, (1983) 48:4436; Lindlar et al., *Org. Synth.*, (1973) V:880. In the Lindlar process, palladium metal deposited on solid BaSO$_4$ along with quinoline reduces alkynes to cis or Z alkenes. However, in the Lindlar reduction an external source of hydrogen is required, and the amount of hydrogen gas introduced into the reaction must be monitored carefully, otherwise over reduction to the alkane can occur. Furthermore, synthetic quinoline must be used in the Lindlar process, since commercially available quinoline normally contains trace amounts of sulfur, which is difficult to remove and inhibits catalytic activity.

Introduction of methyl propynoate (10 mole %) allowed for the conversion of an internal alkyne to an alkane (entry 17. The complete reaction required 24 h). Similarly, both E-5-decene (entry 14) and E-butyl hexenoate (entry 6) were unreactive using triethoxysilane alone, but addition of one equivalent of methyl propynoate to the solution prior to the addition of triethoxysilane allowed for complete hydrogenation of the olefinic moiety. A similar effect was observed in the reduction of N,N-diethyl cinnamamide (entry 11) in that only partial reduction occurred in the absence of 10 mole % of methyl propynoate. The reaction rate for hydrogenation of terminal olefins was greatly increased using methyl propynoate. The methyl propynoate addition has a profound influence on the course of the reaction, although applicants are presently not able to rationalize its exact mechanistic action. A more vigorous evolution of hydrogen ensues in the presence of methyl propynoate. Presumably, more active surface sites of the metal are liberated by its addition.

In entries 14, 16 and 17, the capillary gas chromatograph yields were measured relative to a dodecane internal standard. The volatility of the products prohibited high isolation yields.

Table II lists several other examples of hydrogenation reactions according to the claimed invention using water alone as the aqueous solution. Again, no external hydrogen source was necessary, and no hydrosilylated material was obtained, meaning hydrogenation proceeds by a true hydrometallic reaction rather than hydrosilylation followed by protodesilylation. In certain cases, the yield was depressed due to volatility of the product (entries 3, 4 and 5). In entry 6, a second portion of triethoxysilane (2.5 equivalents) was added after 1 hour. In entries 7 (second reaction) and 12, only 1 equivalent of triethoxysilane was used. In entry 8, several isomeric products were obtained. In entry 11, 3 equivalents of sodium hydroxide were added. Propargyl alcohol was used in certain cases to achieve further hydrogenation, which acts in the same manner as methyl propynoate. In entries 3 and 8 of Table II, little or no reduction occurred without addition of propargyl alcohol. Entry 7 demonstrates the hydrogenation of alkynes to Z- alkenes with good selectivity by the addition of one equivalent of triethoxysilane. All the products in Table II underwent only standard extractive purification, yet spectral analysis showed no products other than those shown in Table II.

TABLE I

| Hydrogenations Using Triethoxysilane and Catalytic Palladium (II) Acetate in THF/Water. | | | |
|---|---|---|---|
| Entry | Substrate | Product | % Yield |
| 1 | Ph–(C=O)–Ph | Ph–(C=O)–Ph | 100 |

TABLE I-continued
Hydrogenations Using Triethoxysilane and Catalytic Palladium (II) Acetate in THF/Water.

| Entry | Substrate | Product | % Yield |
|---|---|---|---|
| 2 | steroid with $C_8H_{17}$ side chain, enone | reduced steroid $C_8H_{17}$, cis/trans (3:1) | 96 |
| 3 | isophorone | No reaction | — |
| 4 | Ph-CH=CH-C(O)OCH$_3$ | Ph-CH$_2$-CH$_2$-C(O)OCH$_3$ | 91 |
| 5 | 4-CH$_3$O-C$_6$H$_4$-CH=CH-C(O)O-(2-ethylhexyl) | 4-CH$_3$O-C$_6$H$_4$-CH$_2$-CH$_2$-C(O)O-(2-ethylhexyl) | 92 |
| 6 | butyl 2-hexenoate | No reaction | — |
| | | butyl hexanoate | 99 |
| 7 | ethyl 2,4-hexadienoate | ethyl hexanoate | 100 |
| 8 | coumarin | dihydrocoumarin | 74 |
| 9 | EtO$_2$C-CH=CH-CO$_2$Et | EtO$_2$C-CH$_2$-CH$_2$-CO$_2$Et | 98 |
| 10 | n-C$_5$H$_{11}$-C≡C-C(O)OC$_4$H$_9$-n | n-C$_7$H$_{15}$-C(O)OC$_4$H$_9$-n | 81 |
| 11 | Ph-CH=CH-C(O)NEt$_2$ | Starting material/reduced (1:3) | — |
| | | Ph-CH$_2$-CH$_2$-C(O)NEt$_2$ | 90 |
| 12 | ethyl 3-oxo-oct-7-enoate | ethyl 3-oxooctanoate | 81 |
| 13 | (+)-Longifolene | No reaction | — |
| 14 | n-C$_4$H$_9$-CH=CH-C$_4$H$_9$-n | No reaction | — |
| | | n-C$_{10}$H$_{22}$ | 100 |
| 15 | CH$_3$CO$_2$-CH(CH$_3$CO$_2$)-CH$_2$-CH$_2$-CH=CH-CH$_3$ | CH$_3$CO$_2$-CH(CH$_3$CO$_2$)-C$_5$H$_{11}$ | 94 |
| 16 | H-C≡C-C$_8$H$_{17}$-n | n-C$_{10}$H$_{22}$ | 35 |

TABLE I-continued
Hydrogenations Using Triethoxysilane and Catalytic Palladium (II) Acetate in THF/Water.

| Entry | Substrate | Product | % Yield |
|---|---|---|---|
| 17 | n-$C_4H_9$—≡—$C_4H_9$-n | n-$C_4H_9$\\=/$C_4H_9$-n<br>n-$C_{10}H_{22}$ | 100<br>90 |

TABLE II
The reduction of alkenes and alkynes with 5 mole % Pd(OAc)$_2$ and triethoxysilane in water.

| Entry | Substrate | Time (h) | Product | Yield |
|---|---|---|---|---|
| 1 | trans-cinnamic acid (PhCH=CHCO$_2$H) | 4 | PhCH$_2$CH$_2$CO$_2$H | 93% |
| 2 | 4-CH$_3$O-C$_6$H$_4$-CH=CH-CO$_2$H | 5 | 4-CH$_3$O-C$_6$H$_4$-CH$_2$CH$_2$-CO$_2$H + 4-CH$_3$O-C$_6$H$_4$-CH=CH-CO$_2$H<br>18:1 | 63% |
| 3 | H$_7$C$_3$-CH=CH-CO$_2$H | 4<br>5 | No Reaction<br>H$_{11}$C$_5$—CO$_2$H | 69% |
| 4 | (methyl-substituted acrylic acid) | 4<br>4 | No Reaction<br>saturated acid + unsaturated acid<br>1:45 | |
| 5 | (Me)$_2$C=CH-CO$_2$H | 4<br>14 | saturated + unsaturated<br>1:8<br>1:4 | |
| 6 | CH$_3$CH=CHCH=CHCH$_2$CO$_2$H | 5 | H$_{11}$C$_5$—CO$_2$H | 78% |
| 7 | H$_{11}$C$_5$—≡—CO$_2$H | 4<br>4 | H$_{15}$C$_7$—CO$_2$H<br>H$_{11}$C$_5$\\=/CO$_2$H + H$_{11}$C$_5$\\=\\CO$_2$H + H$_{11}$C$_5$—≡—CO$_2$H<br>16:1:2 | 92%<br>99% |
| 8 | CH$_2$=CHCH$_2$CH$_2$CO$_2$H | 4<br>5.5 | C$_4$H$_9$—CO$_2$H | 96% |
| 9 | CH$_3$CH$_2$CH=CHCH$_2$CO$_2$H | 4 | H$_{11}$C$_5$—CO$_2$H + trans-alkenoic + other alkenoic<br>6:2:1 | 63% |
| 10 | norbornenecarboxylic acid | 5 | norbornane-CO$_2$H (endo) + norbornene-CO$_2$H<br>19:1 | 81% |

TABLE II-continued

The reduction of alkenes and alkynes with 5 mole % Pd(OAc)₂ and triethoxysilane in water.

| Entry | Substrate | Time (h) | Product | Yield |
|---|---|---|---|---|
| 11 | 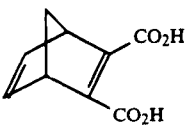 | 5 | 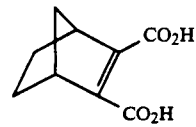 | 76% |
| 12 | 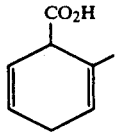 | 5 | 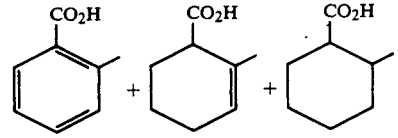 1:12:2 | 95% |

We claim:

1. A compound comprising a polysiloxane matrix material containing a homogeneous dispersion of metal particles, wherein the polysiloxane matrix material is uncalcinated and substantially all of the metal is in the zero oxidation state.

2. The compound according to claim 1, wherein the metal has a standard reduction potential greater than the reduction potential of H₂ and Si-H.

3. The compound according to claim 1, wherein the metal is selected from the group consisting of palladium, rhodium, platinum, ruthenium, copper, silver, antimony, rhenium, iridium, gold, mercury, bismuth and manganese.

4. The compound according to claim 1 wherein the compound is in a sol state.

5. The compound according to claim 1 wherein the compound is in a gel state.

6. The compound according to claim 1 wherein the compound is in a xerogel state.

7. The compound according to claim 1, wherein the metal is palladium.

8. The compound according to claim 1, wherein the metal is rhodium.

9. The compound according to claim 1, wherein the metal particles have a size of less than 100 Å.

10. The compound according to claim 1, wherein the metal particles have a size of less than 50 Å.

11. The compound according to claim 1, wherein the compound contains 0.1 to 15 mole % of the metal.

12. A method of preparing an uncalcinated polysiloxane matrix material containing a homogeneous dispersion of metal particles in the zero oxidation state, which comprises mixing a siloxane compound having Si-H groups with a metal salt in an aqueous solution; wherein the siloxane compound is polymerized into a polysiloxane matrix, the metal is reduced to the zero oxidation state, and particles of the metal are homogeneously dispersed within the polysiloxane matrix.

13. The method according to claim 12, wherein the siloxane compound is selected from the group consisting of monoalkoxysilanes, dialkoxysilanes, trialkoxysilanes, and mixtures of the same.

14. The method according to claim 13, wherein the siloxane compound further comprises a tetraalkoxysilane.

15. The method according to claim 12, wherein the siloxane compound is selected from the group of monoethoxysilane, diethoxysilane, triethoxysilane and mixtures of the same.

16. The method according to claim 15, wherein the siloxane compound further comprises tetraethoxysilane.

17. The method according to claim 12, wherein the metal is selected from the group consisting of palladium, rhodium, platinum, ruthenium, copper, silver, antimony, rhenium, iridium, gold, mercury, bismuth and manganese.

18. The method according to claim 12, wherein the metal salt is selected from the group consisting of palladium(II) acetate and palladium(II) chloride.

19. The method according to claim 12, wherein the metal salt is rhodium(III) trichloride.

20. The method according to claim 12, wherein the aqueous solution is selected from the group consisting of water and mixtures of water with an organic solvent miscible in water and capable of solubilizing the siloxane compound.

21. The method according to claim 20, wherein the aqueous solution is a mixture of water and tetrahydrofuran and the volume ratio of tetrahydrofuran:water is from 2:1 to 10:1.

22. The method according to claim 20, wherein the aqueous solution is a mixture of water and tetrahydrofuran and the volume ratio of tetrahydrofuran:water is 5:1.

23. The method according to claim 12, wherein the polysiloxane matrix contains 0.1 to 15 mole percent of the metal.

* * * * *